(12) United States Patent
Aimu et al.

(10) Patent No.: US 10,683,186 B2
(45) Date of Patent: Jun. 16, 2020

(54) METHOD OF BONDING STRIP-SHAPED MEMBERS TO EACH OTHER AND APPARATUS CONFIGURED TO BOND STRIP-SHAPED MEMBERS TO EACH OTHER

(71) Applicant: TOYOTA JIDOSHA KABUSHIKI KAISHA, Toyota-shi, Aichi-ken (JP)

(72) Inventors: Masanori Aimu, Toyota (JP); Naohiro Mitani, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 230 days.

(21) Appl. No.: 15/862,038

(22) Filed: Jan. 4, 2018

(65) Prior Publication Data
US 2018/0215567 A1 Aug. 2, 2018

(30) Foreign Application Priority Data
Feb. 2, 2017 (JP) ................. 2017-017349

(51) Int. Cl.
*B65H 37/04* (2006.01)
*B65H 23/08* (2006.01)
(Continued)

(52) U.S. Cl.
CPC ............. *B65H 23/085* (2013.01); *B32B 7/12* (2013.01); *B65H 37/04* (2013.01); *H01M 4/88* (2013.01); *H01M 8/1039* (2013.01); *H01M 8/1053* (2013.01); *H01M 8/1069* (2013.01); *H01M 8/1088* (2013.01); *H01M 8/1093* (2013.01);
(Continued)

(58) Field of Classification Search
None
See application file for complete search history.

(56) References Cited

U.S. PATENT DOCUMENTS

| 2,972,369 A * | 2/1961 | Jensen | ................... B32B 37/08 156/320 |
| 2013/0192750 A1* | 8/2013 | Kiuchi | ................ H01M 4/8814 156/247 |
| 2016/0181644 A1 | 6/2016 | Ohashi et al. | |

FOREIGN PATENT DOCUMENTS

| DE | 10 2015 119 110 A1 | 6/2016 |
| JP | 6-270225 | 9/1994 |

(Continued)

*Primary Examiner* — Jeffrey H Aftergut
(74) *Attorney, Agent, or Firm* — Finnegan, Henderson, Farabow, Garrett & Dunner, LLP

(57) ABSTRACT

There is provided a technique of reducing the possibility of the occurrence of wrinkles in the process of bonding strip-shaped members to each other. A long strip-shaped first member is conveyed in a longitudinal direction of the first member. A width of a long strip-shaped second member in the shorter direction of the second member is larger than a width of the first member in a shorter direction of the first member. The second member is placed such that respective ends in a shorter direction of the second member are freed. The second member is bonded to the first member being conveyed, such that the shorter direction of the first member is aligned with the shorter direction of the second member and that respective ends in the shorter direction of the first member are placed between the respective ends in the shorter direction of the second member. The second member bonded to the first member is then conveyed along with the conveyed first member.

9 Claims, 5 Drawing Sheets

(51) Int. Cl.
*H01M 8/1039* (2016.01)
*H01M 8/1088* (2016.01)
*H01M 8/1086* (2016.01)
*H01M 8/1053* (2016.01)
*H01M 8/1069* (2016.01)
*B32B 7/12* (2006.01)
*H01M 4/88* (2006.01)
*H01M 8/1018* (2016.01)
*H01M 8/1023* (2016.01)

(52) U.S. Cl.
CPC .................. *B32B 2457/18* (2013.01); *B65H 2301/51616* (2013.01); *B65H 2515/842* (2013.01); *B65H 2801/72* (2013.01); *H01M 8/1023* (2013.01); *H01M 2008/1095* (2013.01); *Y02P 70/56* (2015.11)

(56) References Cited

FOREIGN PATENT DOCUMENTS

| | | |
|---|---|---|
| JP | 2007-095464 A | 4/2007 |
| JP | 2009-134953 A | 6/2009 |
| JP | 2015-24586 | 2/2015 |

\* cited by examiner

Fig.4
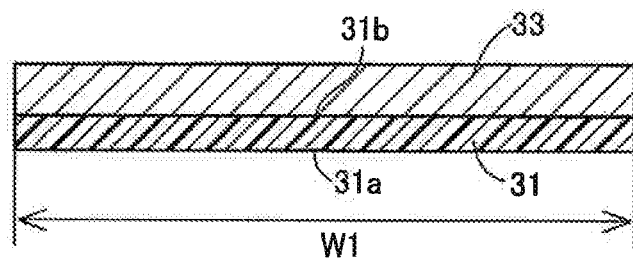
Fig.5
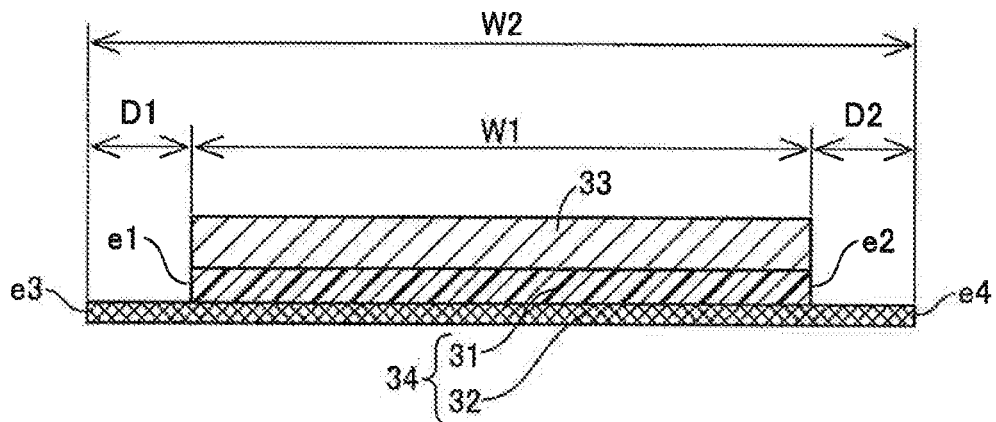
Fig.6
| SAMPLE NO. | S01 | S02 | S03 | S04 |
|---|---|---|---|---|
| SAMPLE SCHEMATIC SECTIONAL VIEW | | | | |
| DISTANCE D1,D2 [mm] | −50 | 0 | 10 | 20 |
| DETECTION NUMBER OF WRINKLES | 10 | 4 | 1 | 0 |

METHOD OF BONDING STRIP-SHAPED MEMBERS TO EACH OTHER AND APPARATUS CONFIGURED TO BOND STRIP-SHAPED MEMBERS TO EACH OTHER

CROSS-REFERENCE TO RELATED APPLICATIONS

The present application claims priority based on Japanese patent application No. 2017-017349 filed on Feb. 2, 2017, the disclosure of which is hereby incorporated by reference in its entirety.

BACKGROUND

Field

The present disclosure relates to a method of bonding strip-shaped members to each other and an apparatus configured to bond strip-shaped members to each other.

Related Art

Various methods and apparatuses have been proposed to bond a long strip-shaped first member and a long strip-shaped second member to each other, as described in, for example, JP 2015-024586A and JP H06-270225A. JP 2015-024586A discloses an apparatus configured to manufacture a multi-layered film by bonding a protective film onto a surface of an optical film such as a polarizer protective film. JP H06-270225A discloses a method of manufacturing a laminate sheet by pressure-bonding an acrylic sheet to a polycarbonate sheet extruded from a die of an extruder.

As disclosed in JP 2015-024586A and JP H06-270225A, in the case of bonding two strip-shaped members to each other, the respective members are conveyed and are bonded to each other, while tensions are applied to the respective members to stretch the respective members for the purpose of suppressing the occurrence of wrinkles in the respective members. When excessively high tensions are applied to the respective members prior to bonding, however, one of the members is likely to be contracted and to be separated after bonding. This results in wrinkling. When excessively low tensions are applied to the respective members prior to bonding, on the other hand, the member may be slacked. This results in wrinkling in the course of bonding.

There is accordingly still a room for improvement with regard to the technique of suppressing the occurrence of wrinkles in the course of bonding strip-shaped members to each other. Especially in the manufacturing process of a fuel cell, various strip-shaped members of low intensities such as an electrolyte membrane are likely to be bonded. There is accordingly a high demand for improvement of the technique.

SUMMARY

According to a first aspect of the disclosure, there is provided a method of bonding a long strip-shaped first member and a long strip-shaped second member to each other. The method of this aspect comprises a conveying process conveying the first member in a longitudinal direction of the first member; and a bonding process bonding the second member to the first member being conveyed, and conveying the second member bonded to the first member along with the first member being conveyed. A width of the second member in a shorter direction of the second member is larger than a width of the first member in a shorter direction of the first member. The bonding process includes placing the second member such that respective ends of the second member in the shorter direction of the second member are freed before the first member is bonded to the second member. The bonding process includes bonding the second member to the first member such that the shorter direction of the first member is aligned with the shorter direction of the second member and respective ends of the first member in the shorter direction of the first member are placed between the respective ends of the second member in the shorter direction of the second member.

The method of this aspect reduces the tension applied to the second member in the process of bonding the first member and the second member to each other, and reduces the possibility of the occurrence of wrinkles in the strip-shaped member after bonding.

According to a second aspect of the disclosure, there is provided an apparatus configured to bond a long strip-shaped first member and a long strip-shaped second member to each other. The apparatus of this aspect comprises a conveying portion configured to convey the first member in a longitudinal direction of the first member; and a bonding portion configured to bond the second member to the first member being conveyed by the conveying portion and send out the second member along with the first member conveyed by the conveying portion. A width of the second member in a shorter direction of the second member is larger than a width of the first member in a shorter direction of the first member. The bonding portion is configured to place the second member before being bonded to the first member such that respective ends of the second member in the shorter direction of the second member are freed. The bonding portion is configured to bond the second member to the first member such that the shorter direction of the first member is aligned with the shorter direction of the second member and respective ends of the first member in the shorter direction of the first member are placed between the respective ends of the second member in the shorter direction of the second member.

The apparatus of this aspect reduces the possibility of the occurrence of wrinkles in the strip-shaped member after bonding.

The present disclosure may be implemented by any of various aspects other than the bonding method of the strip-shaped members to each other and the bonding apparatus configured to bond the strip-shaped members to each other, for example, a manufacturing method and a manufacturing apparatus configured to manufacture a strip-shaped member such as an electrolyte membrane for a fuel cell by using the bonding method, control methods of the bonding apparatus and the manufacturing apparatus, computer programs configured to implement the bonding method and the control methods of the bonding apparatus and the manufacturing apparatus, and non-transitory recording media in which such computer programs are recorded.

BRIEF DESCRIPTION OF DRAWINGS

FIG. 4 is a schematic sectional view illustrating a first member;

FIG. 5 is a schematic sectional view illustrating a two-layered member;

FIG. 6 is a diagram illustrating results of an experiment with regard to a relationship between the distance and the number of wrinkles;

DETAILED DESCRIPTION

A. First Embodiment

Figure 1:
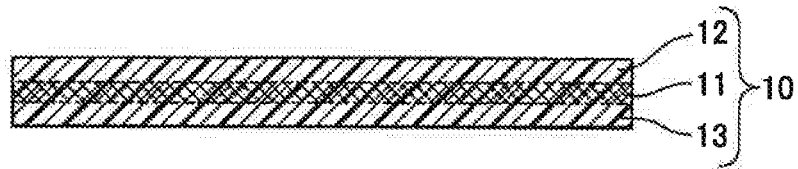
FIG. 1 is a schematic sectional view illustrating the configuration of an electrolyte membrane for a fuel cell manufactured according to a first embodiment.

FIG. 1 is a schematic sectional view illustrating the configuration of an electrolyte membrane 10 for a fuel cell. The electrolyte membrane 10 is manufactured through the respective processes of a bonding method according to a first embodiment described later. The electrolyte membrane 10 is a thin membrane of an electrolyte resin that provides good proton conductivity in the wet state. The electrolyte membrane 10 is used for a polymer electrolyte fuel cell configured to receive supplies of hydrogen and oxygen as reactive gases and generate electric power.

According to the embodiment, the electrolyte resin used to form the electrolyte membrane 10 is a fluorine-based ion exchange resin. For example, a perfluorosulfonic acid polymer having —$SO_3H$ group as an ion exchange group at a side-chain end, such as Nafion (registered trademark) may be employed as the electrolyte resin.

The electrolyte membrane 10 is a reinforced-type electrolyte membrane and is configured to include a reinforcement layer 11 provided between a first electrolyte layer 12 and a second electrolyte layer 13, which are made of only the electrolyte resin. The reinforcement layer 11 is formed to include a membrane-like porous member having pores. The porous member is formed from a resin material such as a fluororesin having a three-dimensional net-like structure in which pores are tangled three-dimensionally. The pores of the porous member are filled with the electrolyte resin. The resin material used to form the porous member will be described later. The presence of the reinforcement layer 11 in the electrolyte membrane 10 suppresses the strength of the electrolyte membrane 10 from being decreased by the thickness reduction.

Figure 2:
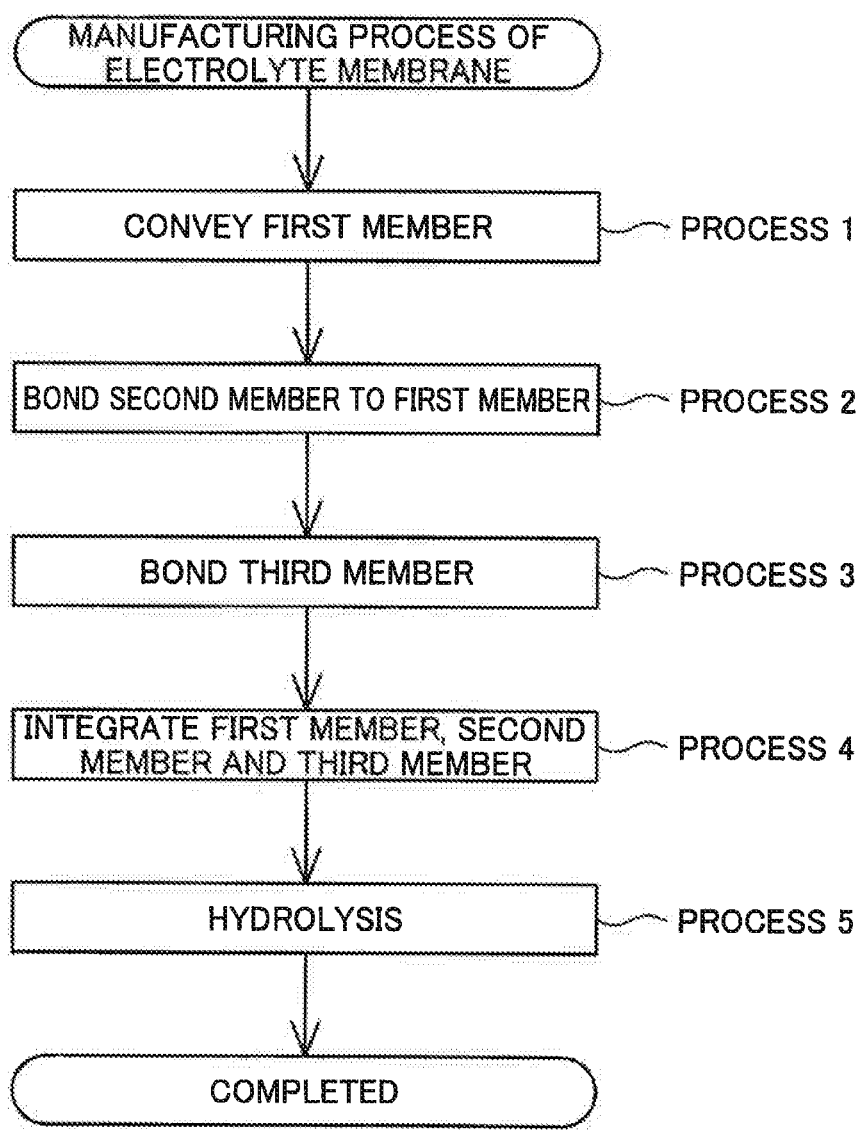
FIG. 2 is a flow diagram showing a manufacturing process of the electrolyte membrane.
Figure 3:
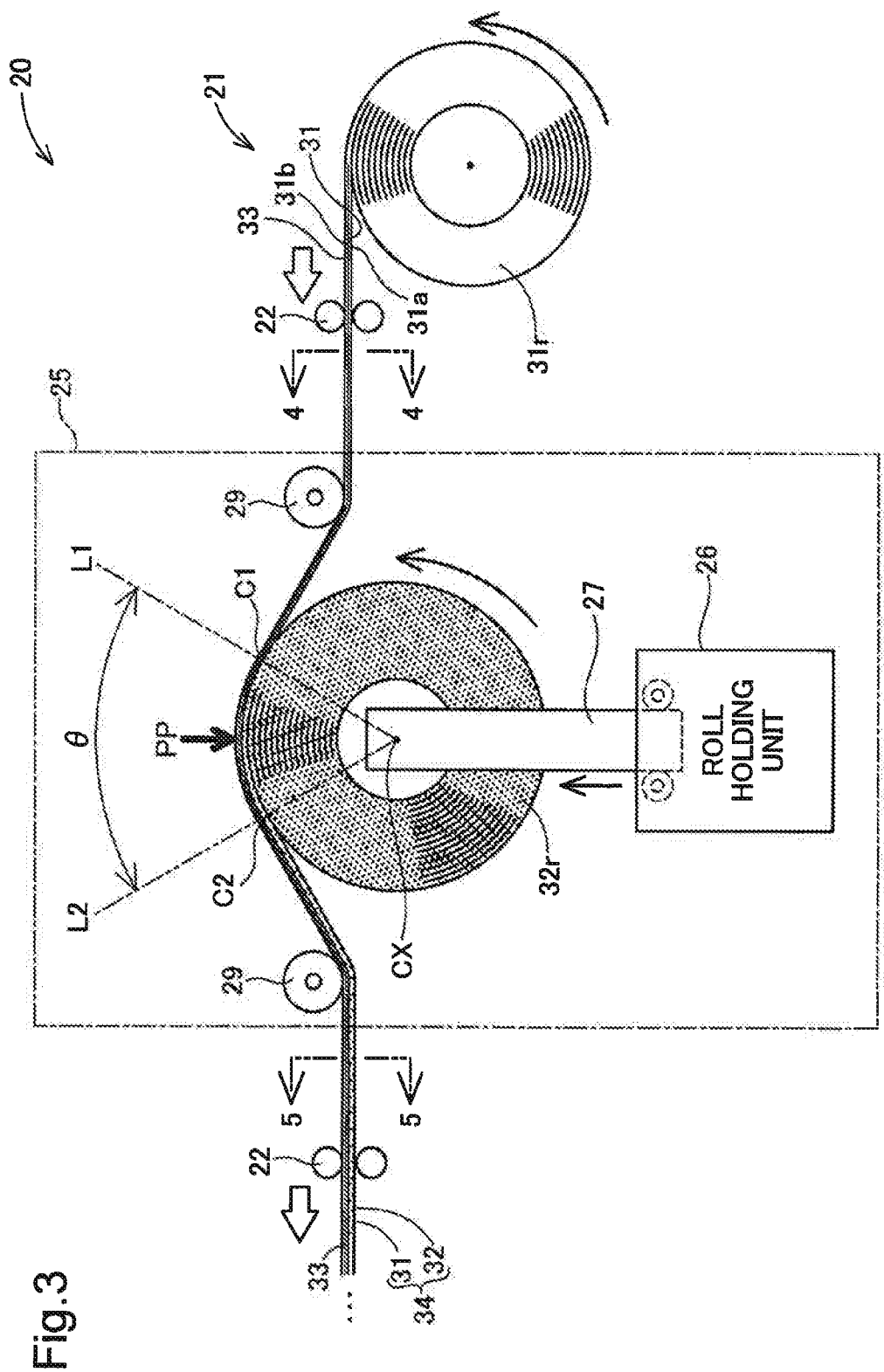
FIG. 3 is a schematic diagram illustrating the configuration of a bonding apparatus.

FIG. 2 is a flow diagram showing a manufacturing process of the electrolyte membrane 10. In this manufacturing process, the bonding method according to the first embodiment is performed in processes 1 and 2. FIG. 3 is a schematic diagram illustrating the configuration of a bonding apparatus 20 used in the processes 1 and 2. The following first describes the configuration of the bonding apparatus 20 with reference to FIG. 3 and subsequently describes the details of the process 1 and the process 2.

The bonding apparatus 20 may include a feeding portion 21, a conveying portion 22 and a bonding portion 25. The bonding apparatus 20 is configured such that a long strip-shaped first member 31 fed out by the feeding portion 21 is continuously conveyed in its longitudinal direction by the conveying portion 22 and that a long strip-shaped second member 32 is bonded to a first surface 31a of the first member 31 by the bonding portion 25.

The first member 31 is formed from a precursor of an electrolyte membrane for a fuel cell or more specifically formed from a precursor of an electrolyte resin prior to acquisition of ion conductivity (proton conductivity) by hydrolysis. The second member 32 is formed from the porous member included in the reinforcement layer 11 as described above. The second member 32 may be produced by, for example, stretching a raw tape formed by extrusion molding of a resin material with a simultaneous biaxial stretching machine or the like and firing the stretched raw tape. For example, polytetrafluoroethylene (PTFE) as a fluororesin, polyethylene (PE) or polypropylene (PP) may be employed as the resin material used to form the second member 32. According to the embodiment, an opposite surface 31b of the first member 31 that is opposite to the first surface 31a is covered with a membrane member 33 as described later in detail.

The feeding portion 21 is configured to feed out the first member 31 to the conveying portion 22. A first roll 31r provided by winding the first member 31 into a roll is placed in the feeding portion 21. The first member 31 is pulled out in the longitudinal direction from the feeding portion 21 by the conveying force applied to the first member 31 by the conveying portion 22.

The conveying portion 22 is configured to convey the first member 31 in its longitudinal direction. The conveying portion 22 is configured to include a plurality of conveyance rollers arranged to form a conveyance path of the first member 31 and a motor, which is not shown in figures, provided to drive the plurality of conveyance rollers. The conveying portion 22 is configured to convey the first member 31 by the conveying force generated by the motor. The conveying portion 22 is configured to convey the first member 31 in the conveyance direction under a tension corresponding to a predetermined target tension at a conveyance speed corresponding to a predetermined target value and make the first member 31 pass through the bonding portion 25.

FIG. 4 is a schematic sectional view illustrating the first member 31, taken on a line 4-4 shown in FIG. 3. FIG. 4 illustrates the state of the first member 31 before entering the bonding portion 25. As described above, according to the embodiment, the second surface 31b of the first member 31 that is opposite to the first surface 31a is covered with the long strip-shaped membrane member 33. The membrane member 33 serves as a back sheet to support the first member 31. The first member 31 may be manufactured by forming a film of the precursor of the electrolyte resin on the membrane member 33 provided in advance by an extrusion molding machine.

The membrane member 33 may be preferably formed from a material that closely adheres to the first member 31 and is readily separable from the first member 31. According to the embodiment, the membrane member 33 is formed from a fluororesin film. The membrane member 33 is preferably provided to cover over the entire second surface 31b of the first member 31. According to the embodiment, the membrane member 33 is configured to have a width that is identical with a width W1 of the first member 31 in its shorter direction.

The bonding portion 25 of the bonding apparatus 20 shown in FIG. 3 is configured to bond the second member 32 to the first surface 31a of the first member 31 being conveyed by the conveying portion 22. According to the embodiment, the bonding portion 25 is configured to include a roll holding unit 26. The roll holding unit 26 includes an arm 27 configured to be extended and contracted by the driving force of the motor. A second roll 32r of the second member 32 is mounted at an end of the arm 27.

The second roll 32r is provided by winding the second member 32 into a roll around a center axis CX that is along a shorter direction of the second member 32. The second member 32 is held in the second roll 32r such that respective ends in the shorter direction of the second member 32 are not constrained but are freed. The second member 32 is placed in the form of the second roll 32r in the bonding portion 25. More specifically, the second member 32 is placed in the bonding portion 25 such that the respective ends in the shorter direction of the second member 32 are not pinched and are freed to minimize the tension applied in the shorter direction.

The second roll 32r is mounted to the arm 27 such that the shorter direction of the second member 32 is aligned with the shorter direction of the first member 31 conveyed by the conveying portion 22 and that the direction of rotating the second roll 32r to draw out the second member 32 is identical with the conveying direction of the first member 31. The arm 27 is configured to hold the second roll 32r to be rotatable about the center axis CX.

The roll holding unit 26 is configured to extend the arm 27 and bring a side face of the second roll 32r into contact with the first surface 31a of the first member 31 that is stretched in the longitudinal direction and conveyed by the conveying portion 22. The roll holding unit 26 is configured to shift the position of the second roll 32r to at least a position where the second roll 32r presses up the first member 31 from the position before the second roll 32r comes into contact with the first member 31. This configuration winds up the first member 31 on the side face of the second roll 32r and provides a plane contact between the first member 31 and the second member 32 located on an outermost layer of the second roll 32r. The tension of the first member 31 generates a pressing force PP to press the first member 31 against the second member 32 of the second roll 32r and thereby bonds the second member 32 to the first member 31. The bonding apparatus 20 is configured to change the pressing force PP by adjusting the length of extension of the arm 27 and thereby regulate the adhesive force of the second member 32 to the first member 31.

In the bonding portion 25 viewed in the direction of the center axis CX of the second roll 32r, a contact start point C1 denotes a point indicating the position where the second roll 32r starts coming into contact with the conveyed first member 31. A contact end point C2 denotes a point indicating the position where the second member 32 starts separating from the second roll 32r. In the description below, a central angle θ of an arc drawn by the first member 31 and defined by a virtual line L1 of connecting the contact start point C1 with the center axis CX of the second roll 32r and a virtual line L2 of connecting the contact end point C2 with the center axis CX of the second roll 32r is called "bonding range angle θ". The bonding range angle θ indicates a range in which the pressing force PP is applied in the bonding portion 25 to bond the first member 31 and the second member 32 to each other. The bonding apparatus 20 is configured to change the bonding range angle θ by adjusting the length of extension of the arm 27 and thereby regulate the adhesive force of the second member 32 to the first member 31.

According to the embodiment, the bonding portion 25 is configured to include a pair of support rollers 29. The pair of support rollers 29 are arranged on the second surface 31b-side of the first member 31 such that the second roll 32r is placed between the pair of support rollers 29 in the conveying direction of the first member 31. The second surface 31b of the first member is shown in FIG. 4. The configuration that the support rollers 29 support the second surface 31b-side of the first member 31 increases the pressing force PP applied to the second roll 32r by the first member 31 and thereby enhances the adhesive force of the second member 32 to the first member 31. The bonding apparatus 20 is configured to regulate the pressing force PP and the bonding range angle θ by adjusting the positions of the respective support rollers 29 relative to the second roll 32r. The pair of support rollers 29 may be omitted as appropriate.

The second member 32 bonded to the first member 31 is fed out from the second roll 32r by the conveying force of the first member 31 applied by the conveying portion 22 and is conveyed to downstream of the bonding portion 25. In the description below, a layered member provided by bonding the first member 31 and the second member 32 to each other is called "two-layered member 34". According to the embodiment, a second bonding portion (illustration and detailed description thereof are omitted) is provided on the downstream side of the bonding portion 25 in the bonding apparatus 20 and is configured to bond a third member, which is described later, to the two-layered member 34. A wind-up portion, which is not shown in figures, may be provided on the downstream side of the bonding portion 25 to wind up the two-layered member 34, in place of the second bonding portion.

The following describes the process 1 and the process 2 shown in FIG. 2. The process 1 is a conveyance process of the first member 31. In the process 1, the first member 31 is conveyed in its longitudinal direction by the conveying portion 22 to pass through the bonding portion 25. The process 2 is a bonding process configured to bond the second member 32 to the conveyed first member 31. In the process 2, after the conveying portion 22 starts conveying the first member 31, the arm 27 of the roll holding unit 26 is extended to press the second roll 32r against the first member 31 and thereby bond the second member 32 to the first member 31 as described above. The second member 32 bonded to the first member 31 is conveyed to downstream along with the first member 31 conveyed by the conveying portion 22.

As described above, in the process 2, the second member 32 is bonded to the first member 31, while being wound on the second roll 32r. In other words, before the second member 32 is bonded to the first member 31, the second member 32 is not stretched in the longitudinal direction but is placed with suppression of the tension from being applied in the longitudinal direction to the second member 32. According to the embodiment, the "stretched" state means the state that a long flexible member is supported at two points that are away from each other in a horizontal direction and should be distinguished from the state that the long flexible member is simply placed. This configuration reduces the possibility of a neck-in phenomenon that causes the second member 32 to be contracted in the shorter direction due to the tension in the longitudinal direction.

The respective ends in the shorter direction of the second member 32 are freed on the second roll 32r as described above. This configuration suppresses the tension of stretching the second member 32 in the shorter direction from being applied to the second member 32 before the second member 32 is bonded to the first member 31. This configuration accordingly suppresses a residual stress caused by the tension applied to the second member 32 prior to bonding from being generated in the two-layered member 34. This configuration suppresses the first member 31 and the second member 32 of the two-layered member 34 from being separated from each other by such a tension and thereby reduces the possibility of the occurrence of wrinkles in the two-layered member 34.

FIG. 5 is a schematic sectional view illustrating the two-layered member 34, taken on a line 5-5 shown in FIG. 3. The second member 32 is configured to have a width W2 in the shorter direction that is larger than the width W1 in the shorter direction of the first member 31 (W2>W1). In the process 2, the first member 31 and the second member 32 are bonded to each other in the bonding portion 25 such that respective ends e1 and e2 in the shorter direction of the first member 31 are aligned to be placed between respective ends e3 and e4 in the shorter direction of the second member 32. This configuration causes the respective ends e3 and e4 of the second member 32 to be extended to the outer sides of the respective ends e1 and e2 of the first member 31 in the shorter direction of the two-layered member 34 and to be away from the first member 31.

The respective ends e3 and e4 of the second member 32 are likely to be charged with static electricity before the second member 32 is bonded to the first member 31. Such static electricity is likely to generate a force applied in a direction of making the respective ends e3 and e4 of the second member 32 away from the first member 31. The respective ends e3 and e4 of the second member 32 are also likely to have a structural deformation or deterioration, such as burr, pilling or crush of pores, in the cutting process of the second member 32 or the like. Such a structural deformation or deterioration at the respective ends e3 and e4 of the second member 32 is likely to reduce the adhesive force of the respective ends e3 and e4 of the second member 32 to the first member 31. In the process 2, however, the first member 31 and the second member 32 are bonded to each other in the state that the respective ends e3 and e4 of the second member 32 are away from the the first member 31 as described above. This configuration suppresses the second member 32 from being separated from the first member 31 due to the static electricity generated at the respective ends e3 and e4 of the second member 32 or due to the structural deformation or deterioration of the respective ends e3 and e4 of the second member 32.

In the description below, the respective ends e1 and e2 of the first member 31 are called "first end e1" and "second end e2". The respective ends e3 and e4 of the second member 32 are called "third end e3" and "fourth end e4". The first end e1 of the first member 31 and the third end e3 of the second member 32 are located on one end in the shorter direction of the two-layered member 34. The second end e2 of the first member 31 and the fourth end e4 of the second member 32 are located on the other end in the shorter direction of the two-layered member 34.

A distance D1 denotes a distance between the first end e1 and the third end e3, and a distance D2 denotes a distance between the second end e2 and the fourth end e4. The distances D1 and D2 respectively denote the lengths of the respective ends e3 and e4 of the second member 32 extended in the shorter direction from the first member 31. Each of the distances D1 and D2 is preferably not less than 10 mm. This configuration causes the respective ends e3 and e4 of the second member 32 from being sufficiently away from the respective ends e1 and e2 of the first member 31 and thereby suppresses the second member 32 from being separated from the first member 31, Each of the distances D1 and D2 is more preferably not less than 20 mm. This configuration further suppresses the second member 32 from being separated from the first member 31. According to the embodiment, both the distances D1 and D2 are set to values of not less than 20 mm. According to the embodiment, the distances D1 and D2 are set to values approximately equal to each other. According to a modification, the distances D1 and D2 may be set to values different from each other.

The distances D1 and D2 are preferably set to such lengths that do not cause wrinkles in the two-layered member 34 during conveyance of the two-layered member 34 due to the configuration that the respective ends e3 and e4 of the second member 32 are freed. The distances D1 and D2 may be, for example, not greater than 100 mm.

FIG. 6 is a diagram illustrating the results of an experiment with regard to the relationship between the distances D1 and D2 and the number of wrinkles in the two-layered member 34. The inventors of the present disclosure produced samples S01 to S04 of the two-layered member 34 in the above processes 1 and 2 as described below, for the purpose of survey of the relationship between the distances D1 and D2 and the number of wrinkles in the two-layered member 34. The respective samples S01 to S04 were produced under substantially the same conditions except the difference of the distances D1 and D2.

Outline of Conditions of Producing Respective Samples:
(1) First Member 31:

The first member 31 was produced as a single-layer thin film formed on the membrane member 33 serving as the back sheet by extrusion molding of a precursor of an electrolyte resin. The precursor of the electrolyte resin used had —SO$_2$F group at its side-chain end and had the ion exchange capacity (IEC) of 1.3 to 1.8 meg/g. The first member 31 was formed to have the thickness of about 2 to 20 μm. The first member 31 was formed to have the thickness W1 of about 300 to 600 mm. The membrane member 33 was formed from a fluororesin.

(2) Second Member 32:

The second member 32 was produced by stretching a raw tape, which was formed by extrusion molding of a paste of PTFE fine powder and was rolled, with a simultaneous biaxial stretching machine and firing the stretched raw tape. The second member 32 was formed to have the thickness of about 1 to 5 μm and the porosity of about 40 to 60%. The porosity was determined from the weight ratio and the thickness of the second member 32. The second member 32 was formed to have the thickness W2 of about 300 to 600 mm.

(3) Conditions of Bonding process

Conveyance tension of the first member 31: 0.1 to 0.8 MPa

Conveyance speed of the first member 31: 5 to 15 m/minute

Bonding range angle θ: 10 to 100 degrees

Pressing force PP: 0.05 to 0.4 MPa

In the table of FIG. 6, the distances D1 and D2 take negative values when the respective ends e3 and e4 of the second member 32 are located on the inner sides of the respective ends e1 and e2 of the first member 31, The distances D1 and D2 take positive values when the respective ends e3 and e4 of the second member 32 are located on the outer sides of the respective ends e1 and e2 of the first member 31. The detection number of wrinkles was determined by visually counting the wrinkles in the two-layered member 34 of 20 m in length.

As shown by the results of this experiment, the detection number of wrinkles decreased with an increase in the distances D1 and D2. The detection number of wrinkles was four in the sample S02 having the distances D1 and D2 of 0 mm, while the detection number of wrinkles was one in the sample S03 having the distances D1 and D2 of 10 mm. These results clearly show that the distances D1 and D2 of greater than 0 mm significantly decrease the detection number of wrinkles.

The detection number of wrinkles was one in the sample S03 having the distances D1 and D2 of 10 mm, while the detection number of wrinkles was zero in the sample S04 having the distances D1 and D2 of 20 mm. These results show that the distances D1 and D2 of not less than 10 mm are preferable and the distances D1 and D2 of not less than 20 mm are more preferable.

Figure 7:
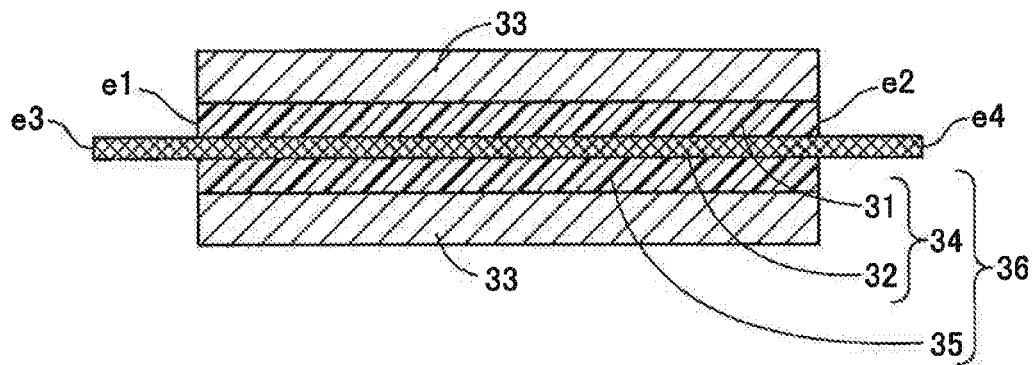
FIG. 7 is a schematic sectional view illustrating a three-layered member.

The process 3 shown in FIG. 2 is described below with reference to FIG. 7. FIG. 7 is a schematic sectional view illustrating a three-layered member 36 produced in the process 3. In the process 3, the three-layered member 36 is produced by bonding a third member 35 to a second member 32-side surface of the two-layered member 34 produced in the above processes 1 and 2. The third member 35 is a long strip-shaped member formed from a precursor of an electrolyte resin prior to acquisition of ion conductivity by hydrolysis. In the process 3, the third member 35 is conveyed in the longitudinal direction and is pressed against and bonded to the two-layered member 34 by means of a pressure roller not shown in figures.

According to the embodiment, the third member 35 is formed from the same precursor of the electrolyte resin as that of the first member 31. According to the embodiment, the third member 35 is configured to have a width and a thickness in the shorter direction that are identical with those of the first member 31. According to a modification, the precursor of the electrolyte resin used to form the third member 35 may be different from the precursor of the electrolyte resin used to form the first member 31. According to a modification, the third member 35 may be configured to have a width and a thickness in the shorter direction that are different from those of the first member 31. According to the embodiment, an opposite surface of the third member 35 that is opposite to a surface bonded to the second member 32 is covered with the membrane member 33, like the first member 31.

Figure 8:
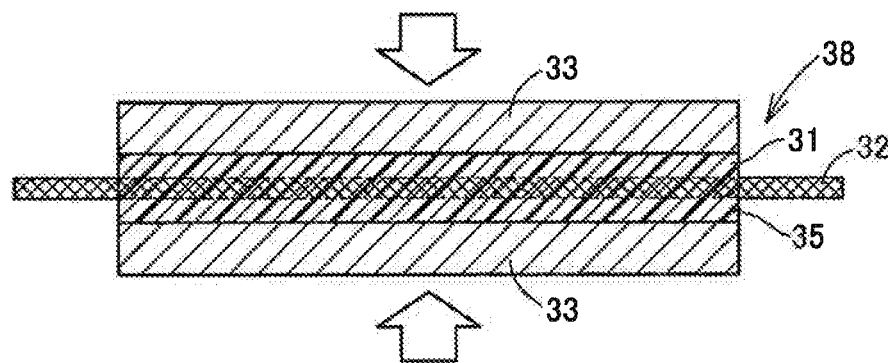
FIG. 8 is a schematic sectional view illustrating a composite member.

The process 4 shown in FIG. 2 is described below with reference to FIG. 8. FIG. 8 is a schematic sectional view illustrating a composite member 38 produced in the process 4. In the process 4, the composite member 38 is produced by pressing the three-layered member 36 produced in the process 3 and thereby integrating the respective members 31, 32 and 35 constituting the three-layered member 36 shown in FIG. 7. In the process 4, the precursor of the electrolyte resin that is used to form the first member 31 and the third member 35 is introduced into the pores of the second member 32, such as to be spread over the second member 32. According to the embodiment, in the process 4, the composite member 38 is produced by pressing the three-layered member 36 in the stacking direction by means of a pressure roller not shown in figures.

In the process 5, the electrolyte membrane 10 is obtained by providing the proton conductivity to the composite member 38 by a hydrolysis process. The hydrolysis process may be performed, for example, as described below. The composite member 38 is soaked in an alkali solution. This changes the $-SO_2F$ group at the side-chain end of the precursor of the electrolyte resin to $-SO_3Na$ group. The composite member 38 is washed with water and is subsequently soaked in an acid solution. This further changes the $-SO_3Na$ group changed in the previous phase to $-SO_3H$ group. This series of processes completes the electrolyte membrane 10 for the fuel cell.

Figure 9:
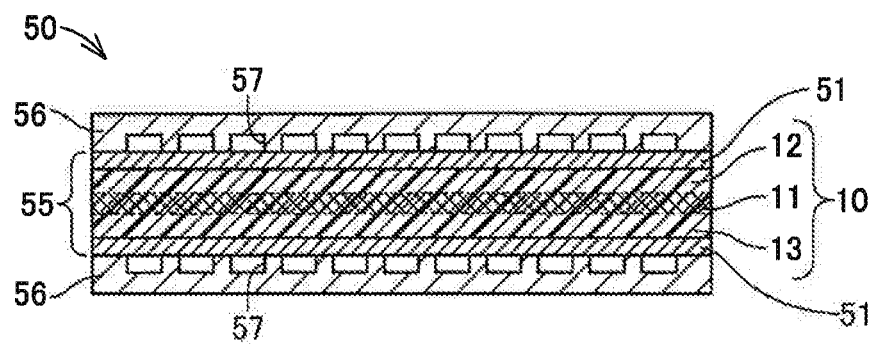
FIG. 9 is a schematic sectional view illustrating the configuration of a fuel cell.

FIG. 9 is a schematic sectional view illustrating the configuration of a fuel cell 50 for which the electrolyte membrane 10 is used. In a manufacturing process of the fuel cell 50, a membrane electrode assembly 55 is produced by placing electrode layers 51 having gas permeability on respective surfaces of the electrolyte membrane 10. Each of the electrode layers 51 may be formed from, for example, a conductive material with catalyst particles supported thereon to accelerate the power generation reaction. For example, platinum (Pt) may be employed as the catalyst. For example, carbon may be employed as the conductive material. Separators 56 are then placed on respective surfaces of the membrane electrode assembly 55. This completes the configuration of the fuel cell 50. The separator 56 may be formed from, for example, a metal plate.

Flow path grooves 57 may be formed on a membrane electrode assembly 55-side surface of the separator 56 to make the reactive gas spread over the opposed electrode layer 51. A flow path member may be placed between the separator 56 and the opposed electrode layer 51, such as to diffuse and flow the reactive gas in a direction along the surface of the electrode layer 51. A seal member, which is not shown in figures, may be provided at an outer circumferential end of the membrane electrode assembly 55, such as to prevent leakage of the reactive gas out of the fuel cell 50.

As described above, according to the bonding method of the processes 1 and 2 of the embodiment and the bonding apparatus 20 configured to implement the bonding method, the second member 32 is bonded to the first member 31 in the state that the tension generated in the second member 32 is minimized. This configuration reduces the possibility of the occurrence of wrinkles in the two-layered member 34. The second member 32 is also bonded to the first member 31 such that the respective ends e3 and e4 of the second member 32 are extended to the outer sides of the respective ends e1 and e2 of the first member 31. This configuration suppresses the second member 32 of the two-layered member 34 from being separated from the first member 31. Accordingly this configuration reduces the possibility of the occurrence of wrinkles in the two-layered member 34, due to separation of the second member 32.

Additionally, manufacturing the electrolyte membrane 10 using the bonding method of the embodiment and the bonding apparatus 20 configured to implement the bonding method reduces the possibility of the occurrence of wrinkles in the electrolyte membrane 10. This configuration accordingly suppresses deterioration of the performance and the durability of the electrolyte membrane 10 and the power generation performance and the durability of the fuel cell 50 using the electrolyte membrane 10 due to the occurrence of wrinkles. This configuration also suppresses an increase in the manufacturing cost of the electrolyte membrane 10 and the fuel cell 50 using the electrolyte membrane 10. Furthermore, the bonding method of the embodiment and the bonding apparatus 20 configured to implement the bonding method provide the various functions and advantageous effects described in the above embodiment.

B. Second Embodiment

Figure 10:
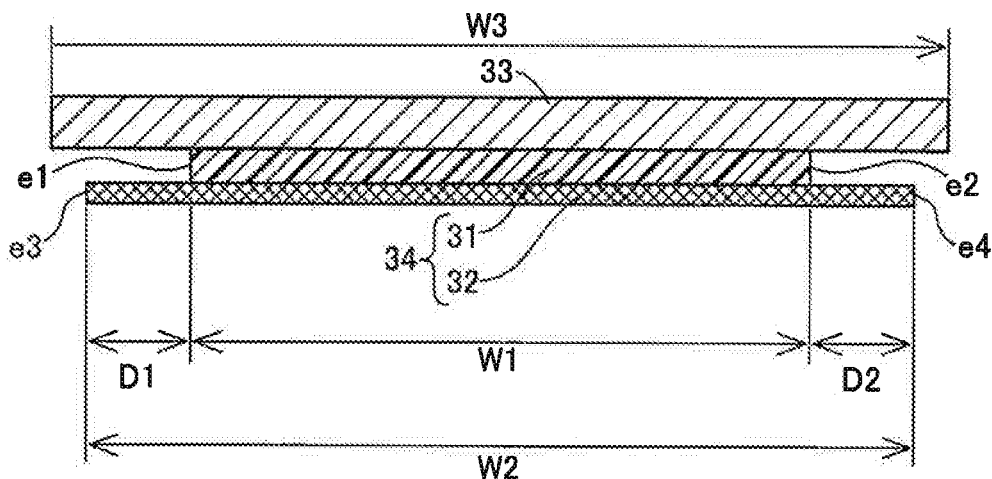
FIG. 10 is a schematic sectional view illustrating a two-layered member produced by a bonding method according to a second embodiment.

A bonding method according to a second embodiment is described below with reference to FIG. 10, FIG. 10 is a schematic sectional view illustrating a two-layered member 34 produced by bonding a first member 31 and a second member 32 to each other by the bonding method of the second embodiment. The bonding method of the second embodiment is performed by the processes 1 and 2 of the first embodiment described above, except the differences described below. The bonding method of the second embodiment may be performed by the bonding apparatus 20 described in the first embodiment. According to the second embodiment, a membrane member 33 provided to support the first member 31 is configured to have a width W3 that is larger than the width W1 of the first member 31. This configuration enhances the supporting performance and the protection performance of the respective ends e1 and e2 of the first member 31.

The width W3 of the membrane member 33 provided to support the first member 31 may be larger than the width W2 of the second member 32. This configuration enables the membrane member 33 to protect the respective ends e3 and e4 of the second member 32 after the first member 31 is bonded to the second member 32. Additionally, the bonding method of the second embodiment and the bonding apparatus 20 configured to implement the bonding method provide the various functions and advantageous effects described in the first embodiment.

C. Third Embodiment

Figure 11:
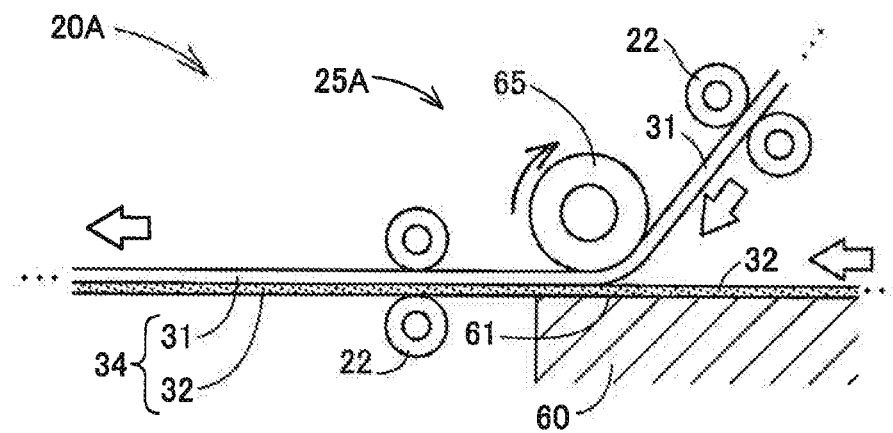
FIG. 11 is a schematic diagram illustrating the configuration of a bonding apparatus according to a third embodiment.

FIG. 11 is a schematic diagram illustrating the configuration of a bonding apparatus 20A to implement a bonding method according to a third embodiment. The configuration of the bonding apparatus 20A of the third embodiment is substantially similar to the configuration of the bonding apparatus 20 described in the first embodiment, except the differences described below. A bonding portion 25A of the bonding apparatus 20A is configured to include a support base 60 on which the second member 32 is placed and a pressure roller 65, in place of the roll holding unit 26. The support base 60 has a support surface 61 on which the second member 32 is placed. The pressure roller 65 is provided at a position opposed to the support surface 61 and is configured to apply a pressing force to a first member 31 and a second member 32 transferred to between the support surface 61 and the pressure roller 65.

In the bonding apparatus 20A, the second member 32 is not wound into a roll but is extended in the longitudinal direction on the support surface 61 of the support base 60 in the state that the respective ends in the shorter direction of the second member 32 are freed. The second member 32 is not stretched in the longitudinal direction on the support surface 61 but is placed with suppression of the tension in the longitudinal direction from being applied to the second member 32, A conveying portion 22 is configured to convey the first member 31 toward the second member 32 placed on the support base 60 and transfer the first member 31 to between the pressure roller 65 and the second member 32 placed on the support surface 61 of the support base 60. The first member 31 and the second member 32 are bonded to each other by the pressing force applied from the pressure roller 65. The second member 32 bonded to the first member 31 is conveyed along with the first member 31. It is desirable that a delivery portion is provided on the upstream side of the support base 60 and is configured to gradually deliver the second member 32 onto the support base 60, in order to reduce the tension applied to a region of the second member 32 on the upstream side of the pressure roller 65.

In the bonding method of the third embodiment and the bonding apparatus 20A configured to implement the bonding method, the second member 32 placed on the support base 60 such that the respective ends in the shorter direction of the second member 32 are freed is bonded to the first member 31 conveyed by the conveying portion 22. Like the first embodiment, the first member 31 and the second member 32 are bonded to each other such as to provide the distances D1 and D2 between the respective ends e1 and e2 of the first member 31 and the respective ends e3 and e4 of the second member 32, This configuration accordingly provides the various functions and advantageous effects similar to those described in the above respective embodiments.

D. Modifications

The various configurations described in the above respective embodiments may be modified as described below. Each of the modifications described below is one example of the aspect of the present disclosure.

D1. Modification 1

According to the above respective embodiments, the first member 31 is formed from the precursor of the electrolyte membrane 10 for the fuel cell, and the second member 32 is formed from the resin material that is used to form the porous member included in the reinforcement layer 11 of the electrolyte membrane 10. The materials used to form the first member 31 and the second member 32 are not necessarily limited to the materials described in the above respective embodiments. The bonding method and the bonding apparatus described in the above respective embodiments may be applied to a process other than the manufacturing process of the electrolyte membrane for the fuel cell. The first member 31 may be formed from a polymer material other than the precursor of the electrolyte resin or may be formed from a fibrous material. The second member 32 may be not necessarily formed from the porous member having pores. The second member 32 may be formed from a fibrous material or may be formed from a thin film of a polymer material other than the fluororesin.

D2. Modification 2

According to the first embodiment described above, the three-layered member 36 is produced by bonding the third member 35 to the two-layered member 34, and the electrolyte membrane 10 for the fuel cell is manufactured by using the composite member 38 obtained by integrating the respective members 31, 32 and 35 constituting the three-layered member 36. According to a modification, an electrolyte membrane may be manufactured by using a composite member that is obtained by integrating the first member 31 and the second member 32 of the two-layered member 34 without bonding the third member 35 to the two-layered member 34.

D3. Modification 3

According to the first embodiment described above, the first member 31 and the third member 35 are supported by the membrane members 33. According to a modification, the membrane members 33 provided to support the first member 31 and the third member 35 may be omitted. The membrane member 33 may be formed from a material other than the fluorine-based resin material.

The disclosure is not limited to any of the embodiments, the examples and the modifications described above but may be implemented by a diversity of other configurations without departing from the scope of the disclosure. For example, the technical features of any of the embodiments and the modifications may be replaced or combined appropriately, in order to solve part or all of the problems described above or in order to achieve part or all of the advantageous effects described above. Any of the technical features that are explicitly described as not essential in the description hereof, as well as any of the technical features other than those described as essential in the description hereof may be omitted appropriately. The present disclosure may be implemented by aspects described below.

(1) According to a first aspect of the disclosure, there is provided a method of bonding a long strip-shaped first member and a long strip-shaped second member to each other. The method of this aspect comprises a conveying process conveying the first member in a longitudinal direction of the first member; and a bonding process bonding the second member to the first member being conveyed, and conveying the second member bonded to the first member along with the first member being conveyed. A width of the second member in a shorter direction of the second member is larger than a width of the first member in a shorter direction of the first member. The bonding process includes placing the second member such that respective ends of the second member in the shorter direction of the second member are freed before the first member is bonded to the second member. The bonding process includes bonding the second member to the first member such that the shorter direction of the first member is aligned with the shorter direction of the second member and respective ends of the first member in the shorter direction of the first member are placed between the respective ends of the second member in the shorter direction of the second member.

The method of this aspect reduces the tension applied to the second member in the process of bonding the first member and the second member to each other, and reduces the possibility of the occurrence of wrinkles in the strip-shaped member after bonding.

(2) In the method of the above aspect, the bonding process may include bonding the first member to the second member that is located on an outermost layer of a roll which is formed by winding the second member around a center axis along the shorter direction of the second member, and the bonding process may include drawing the second member bonded to the first member out of the roll to convey along with the first member.

The method of this aspect suppresses the tension from being applied in a direction reverse to the conveying direction to the second member before the second member is bonded to the first member. The method of this aspect also enables the second member to be smoothly drawn out from the roll by following the first member.

(3) In the method of the above aspect, the first member includes a first surface that is bonded the second member in the bonding process and a second surface opposite to the first surface. The first member may be conveyed with a strip-shaped membrane member covering over the second surface of the first member.

The method of this aspect causes the first member to be supported by the membrane member and thereby reduces the possibility of the occurrence of wrinkles due to the potential slack of the first member.

(4) In the method of the above aspect, a width of the membrane member in a shorter direction of the membrane member may be larger than the width of the second member in the shorter direction of the second member.

The method of this aspect enables the respective ends of the second member to be protected by the membrane member after the first member and the second member are bonded to each other.

(5) In the method of the above aspect, the first member may be formed from a precursor of an electrolyte membrane for a fuel cell prior to acquisition of ion conductivity by hydrolysis. The second member may be formed from a porous member having pores that are to be filled with the precursor. The membrane member may be formed from a fluorine-based resin film.

The method of this aspect causes the porous member to be bonded to the precursor of the electrolyte membrane for the fuel cell that is supported by the fluorine-based resin film. This configuration accordingly reduces the possibility of the occurrence of wrinkles in the precursor of the electrolyte membrane for the fuel cell and facilitates separation of the membrane member after the processing.

(6) In the method of the above aspect, when the respective ends of the first member are expressed as a first end and a second end and one of the respective ends of the second member corresponding to the first end is expressed as a third end and the other of the respective ends of the second member corresponding to the second end is expressed as a fourth end, both a distance between the first end and the third end and a distance between the second end and the fourth end may be configured to be not less than 10 mm.

The method of this aspect causes the respective ends of the second member to be sufficiently away from the corresponding ends of the first member and thereby suppresses the second member from being separated from the first member, compared with a configuration that the respective ends of the second member are located close to the corresponding ends of the first member.

(7) In the method of the above aspect, both the distance between the first end and the third end and the distance between the second end and the fourth end may be configured to be not less than 20 mm.

The method of this aspect causes the respective ends of the second member to be further away from the corresponding ends of the first member and thereby further suppresses the second member from being separated from the first member, compared with the configuration that the respective ends of the second member are located close to the corresponding ends of the first member.

(8) According to a second aspect of the disclosure, there is provided an apparatus configured to bond a long strip-shaped first member and a long strip-shaped second member to each other. The apparatus of this aspect comprises a conveying portion configured to convey the first member in a longitudinal direction of the first member; and a bonding portion configured to bond the second member to the first member being conveyed by the conveying portion and send out the second member along with the first member conveyed by the conveying portion, wherein a width of the second member in a shorter direction of the second member is larger than a width of the first member in a shorter direction of the first member, the bonding portion is configured to place the second member before being bonded to the first member such that respective ends of the second member in the shorter direction of the second member are freed, and the bonding portion is configured to bond the second member to the first member such that the shorter direction of the first member is aligned with the shorter direction of the second member and respective ends of the first member in the shorter direction of the first member are placed between the respective ends of the second member in the shorter direction of the second member.

The apparatus of this aspect reduces the possibility of the occurrence of wrinkles in the strip-shaped member after bonding.

What is claimed is:

1. A method of bonding a long strip-shaped first member and a long strip-shaped second member to each other, the method comprising:
a conveying process conveying the first member in a longitudinal direction of the first member; and
a bonding process bonding the second member to the first member being conveyed, and conveying the second member bonded to the first member along with the first member being conveyed, wherein
a width of the second member in a shorter direction of the second member is larger than a width of the first member in a shorter direction of the first member,
the bonding process includes placing the second member in a state of being wound around a center axis along the shorter direction of the second member to form a roll of the second member such that respective ends of the second member in the shorter direction of the second member are freed before the first member is bonded to the second member in the bonding process,
the bonding process includes wrapping the first member on an outermost layer of the roll of the second member by a pair of support rollers, the pair of support rollers being arranged so as to sandwich the roll of the second member in a conveying direction of the first member, so as to bond the second member to the first member, and
the bonding process includes bonding the second member to the first member such that the shorter direction of the first member is aligned with the shorter direction of the second member and respective ends of the first member in the shorter direction of the first member are placed between the respective ends of the second member in the shorter direction of the second member.

2. The method according to claim 1,
wherein the bonding process includes bonding the first member to the second member that is located on the outermost layer of the roll of the second member, and
the bonding process includes drawing the second member bonded to the first member out of the roll to convey along with the first member.

3. The method according to claim 1,
wherein the first member includes a first surface that is bonded the second member in the bonding process and a second surface opposite to the first surface, and
the first member is conveyed with a strip-shaped membrane member covering over the second surface of the first member.

4. The method according to claim 3,
wherein a width of the membrane member in a shorter direction of the membrane member is larger than the width of the second member in the shorter direction of the second member.

5. The method according to claim 3,
wherein the first member is formed from a precursor of an electrolyte membrane for a fuel cell prior to acquisition of ion conductivity by hydrolysis,
the second member is formed from a porous member having pores that are to be filled with the precursor, and
the membrane member is formed from a fluorine-based resin film.

6. The method according to claim 5,
wherein when the respective ends of the first member are expressed as a first end and a second end and one of the respective ends of the second member corresponding to the first end is expressed as a third end and the other of the respective ends of the second member corresponding to the second end is expressed as a fourth end, both a distance between the first end and the third end and a distance between the second end and the fourth end are configured to be not less than 10 mm.

7. The method according to claim 6,
wherein both the distance between the first end and the third end and the distance between the second end and the fourth end are configured to be not less than 20 mm.

8. An apparatus configured to bond a long strip-shaped first member and a long strip-shaped second member to each other, the apparatus comprising:
a conveying portion configured to convey the first member in a longitudinal direction of the first member; and
a bonding portion configured to bond the second member to the first member being conveyed by the conveying portion and send out the second member along with the first member conveyed by the conveying portion, wherein
a width of the second member in a shorter direction of the second member is larger than a width of the first member in a shorter direction of the first member,
the second member is arranged in a state of being wound around a center axis along the shorter direction of the second member in the bonding portion to form a roll of the second member such that respective ends of the second member in the shorter direction of the second member are freed,
the bonding portion includes a pair of support rollers arranged so as to sandwich the roll of the second member in a conveying direction of the first member and configured to support the first member being conveyed and wrap the first member on an outermost layer of the roll of the second member so as to bond the second member to the first member, and
the bonding portion is configured to bond the second member to the first member such that the shorter direction of the first member is aligned with the shorter direction of the second member and respective ends of the first member in the shorter direction of the first member are placed between the respective ends of the second member in the shorter direction of the second member.

9. An apparatus configured to bond a long strip-shaped first member and a long strip-shaped second member to each other, the apparatus comprising:
a conveying portion configured to convey the first member in a longitudinal direction of the first member; and
a bonding portion configured to bond the second member to the first member being conveyed by the conveying portion and send out the second member along with the first member conveyed by the conveying portion, wherein
a width of the second member in a shorter direction of the second member is larger than a width of the first member in a shorter direction of the first member,
the second member is arranged in a state of being wound around a center axis along the shorter direction of the second member in the bonding portion to form a roll of the second member such that respective ends of the second member in the shorter direction of the second member are freed,
the conveying portion is configured to convey the first member above the roll of the second member,
the bonding portion includes a roll holding unit configured to hold the roll of the second member to bring a side face of the roll of the second member into contact with the first member being conveyed by the conveying portion, the bonding portion is configured to bond the second member to the first member such that the shorter direction of the first member is aligned with the shorter direction of the second member and respective ends of the first member in the shorter direction of the first member are placed between the respective ends of the second member in the shorter direction of the second member, and the roll holding unit is configured to shift a position of the roll of the second member relative to the first member so as to change the size of a contact area between the first member and the side face of the roll of the second member.

* * * * *